United States Patent Office 2,955,139
Patented Oct. 4, 1960

2,955,139

CYCLOALKANOL DERIVATIVES

Bruno Hofer, Munchenstein, Basel Land, and Willy Stoll, Basel, Switzerland, assignors to Geigy Chemical Corporation, New York, N.Y., a corporation of Delaware No Drawing. Filed Dec. 30, 1957, Ser. No. 705,759

Claims priority, application Switzerland Jan. 8, 1957

3 Claims. (Cl. 260—617)

The present invention concerns a process for the production of new cycloalkanol derivatives as well as compounds obtainable according to this process which have valuable pharmacological properties.

Cycloalkanol derivatives of the general formula:

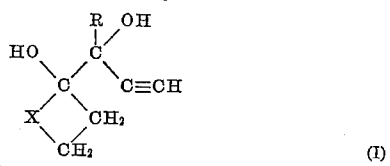

(I)

wherein X is a divalent radical selected from the group consisting of —CH$_2$—CH$_2$— and

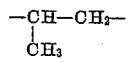

and R represents an alkyl radical having from 1 to 4 carbon atoms, have not been known up to now. It has now been found that these compounds have excellent hypnotic, anaesthetic, sedative and anticonvulsive activity. They can be used therefore, for the treatment of emotional disturbances, insomnia and epilepsy. They are administered perorally, e.g. in capsules, in doses of 10 to 200 mg. per day for adult persons. In addition, they are valuable intermediates for the production of other pharmacologically valuable substances.

The production of the glycols defined above is characterised by condensing an α-hydroxy-ketone (α-ketol) of the general formula:

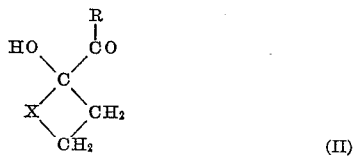

(II)

wherein R and X have the meanings given above, with a mono-metal organic derivative of acetylene, in particular a mono-metal acetylide or an acetlyene mono-magnesium halide. In the former case, the condensation is performed, for example, in liquid abs. ammonia or in anhydrous organic solvents such as methylal, diethyl ether or mixtures thereof, formamide, dimethyl sulphoxide or dimethyl formamide. Alkali metal acetylides can be used in particular as monometal acetylides. They are formed for example in situ either before the reaction by reacting acetylene with the metals dissolved in ammonia or they are formed during the reaction. In the latter case, for example acetylene is reacted with the α-ketol in an organic solvent in the presence of a finely suspended alkali metal hydroxide under normal or slightly raised pressure, e.g. at 1.0 to 1.33 atmospheres.

As mono-metal organic derivative of acetylene, an acetylene mono-magnesium halide may also be reacted with an α-hydroxy-ketone of the general Formula II defined above in a suitable ether-like solvent such as tetrahydrofurane. A suspension of the Grignard component in tetrahydrofurane is obtained, for example by the addition in portions of a solution of ethylene magnesium bromide in tetrahydrofurane to a saturated solution of acetylene in tetrahydrofurane while continuously introducing acetylene (E. R. H. Jones, L. Skatteböl and M. C. Whiting, J. Chem. Soc., 1956, 4765–58). In this case, the further addition of the magnesium compound is only made on completion of the development of ethane and renewed saturation of the reaction mixture with acetylene, so that there is always an excess of acetylene.

The presence of a free hydroxyl group in the ketone component naturally means that at least a molar excess of both the metal acetylide as well as acetylene magnesium halide must be used.

The α-ketols of the general Formula II in which R represents the methyl group necessary as starting materials are obtained for example by condensing cycloaliphatic ketones with alkali metal acetylides and adding water to the ethinyl-cycloalkanols obtained. In addition, the reaction described by Billimoria et al. (J. Chem. Soc., 1951, 3067) of α-hydroxycarboxylic acids with methyl lithium is mentioned.

Starting materials of the general Formula II containing an alkyl radical R having 2–4 carbon atoms are obtained from the cyanohydrins of suitable cycloaliphatic ketones. These are, for example, acylated or reacted with dihydropyrane or a vinyl ether to protect the hydroxyl group. The resultant 1-acyloxy-1-tetrahydropyranyloxy- or 1-(α-alkoxy-ethoxy)-cycloalkane carboxylic acid nitriles can be reacted with low molecular alkyl magnesium halides to form imines from which the α-hydroxy-ketones of the general formula II are obtained by hydrolysis. Examples of such compounds are 1-acetyl-, 1-propionyl-, 1-butyryl- and 1-isobutyryl- cyclopentanol and 1-acetyl-methylcyclopentanol.

The following example further illustrates the production of the new compounds. The temperatures are given in degrees centigrade.

*Example*

100 ml. of abs. ammonia are placed in a 350 ml. flask fitted with a condenser, stirrer, toluene thermometer, tube for the introduction of gas and dropping funnel and the flask, in a carbon dioxide/acetone bath, is cooled to —40°. First 0.1 g. of crystallised ferric nitrate and then 0.4 g. of sodium are then added at —40° to —50°. After the colour which was at first dark blue has changed to grey a further 4.6 g. of sodium are added in small pieces. When the dark blue colour has again changed to grey the whole is stirred for another half hour. About 5 litres of abs. acetylene gas are then introduced and then 12.8 parts of 1-acetyl-cyclopentanol in 20 ml. of abs. ether aer added dropwise within 10 minutes while still introducing acetylene. On completion of the dropwise addition the whole is stirred for another hour under continous introduction of acetylene. The temperature is then raised to about 20° within 10–15 hours the mass being kept stirrable by the addition of abs. ether.

The reaction mixture is stirred for 2 hours under reflux of the ether, 50 ml. of saturated ammonium chloride solution are added at 0° and the reaction product is hydrolysed whereupon the reaction is made acid to Congo red paper with 50% sulphuric acid. It is taken up in ether, the etheral solution is washed neutral and dried over magnesium sulphate and concentrated. On distilling the residue in the vacuum, 3-methyl-4.4-tetramethylene-3.4-dihydroxy-butine-(1) is obtained. B.P.$_{15}$ 117–118°.

Starting from 1-butyryl-cyclopentanol, 3-propyl-4.4-tetramethylene-2.4-dihydroxy-butine-(1) is obtained in an analogous manner, and 1-[1'-hydroxy-2'-methyl-cyclopentyl-(1')]-1-hydroxy-1-methyl-propine-(2) (B.P.$_{12}$ 114–117°) in an analogous manner from 1-acetyl-2-methyl-cyclopentanol.

We claim:
1. A 3-alkyl-4.4-tetramethylene-3.4-dihydroxy-butine-(1) of hte formula

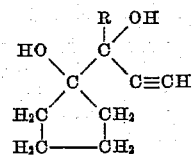

wherein R represents an alkyl radical having from 1 to 4 carbon atoms inclusive.
2. 3-propyl-4.4-tetramethylene-3.4-dihydroxy-butine-(1).
3. 3-methyl-4.4-tetramethylene-3.4-dihydroxy-butine-(1).

References Cited in the file of this patent

Henbest et al.; Jour. Chem. Soc. (London) (1949), pages 2696–2700 (5 pages).
Nikitin et al.; Chem Abstracts, vol. 47 (1953), col. 12,240 (1 page).